United States Patent [19]

Buta

[11] Patent Number: 4,858,506
[45] Date of Patent: Aug. 22, 1989

[54] DUAL ARBOR SCRAP CHOPPER

[76] Inventor: John R. Buta, 140 Penn Ave., Salem, Ohio 44460

[21] Appl. No.: 15,425

[22] Filed: Feb. 17, 1987

[51] Int. Cl.⁴ .............................................. B23D 25/12
[52] U.S. Cl. ........................................ 83/342; 83/345; 83/906; 83/923
[58] Field of Search .................. 83/341, 342, 345, 923, 83/926 G, 906; 407/35, 43, 62

[56] References Cited

U.S. PATENT DOCUMENTS

| | | | |
|---|---|---|---|
| 3,000,250 | 9/1961 | Altmann et al. | 83/341 |
| 3,110,209 | 11/1963 | Takehara | 83/345 |
| 4,004,479 | 1/1977 | Bodnar | 83/345 |
| 4,630,514 | 12/1986 | Ohmori et al. | 83/341 |
| 4,657,192 | 4/1987 | Browning | 241/285 R |

FOREIGN PATENT DOCUMENTS

| | | | |
|---|---|---|---|
| 1117358 | 11/1961 | Fed. Rep. of Germany | 83/341 |
| 1318578 | 5/1973 | United Kingdom | 83/345 |

Primary Examiner—Frank T. Yost
Assistant Examiner—Scott A. Smith
Attorney, Agent, or Firm—Harpman & Harpman

[57] ABSTRACT

An improvement to a dual arbor scrap chopper used for cutting scrap edge trims associated with flat sheet metal strip production. The scrap chopper utilizes a pair of rotary arbors, each having identical angularly displaced multiple sided blades aligned for progressive cutting registration with each other as the arbor rotates. Each of the blades are defined as a symetrical multi-sided configuration allowing each blade to contain multiple usable cutting edges which can be exposed upon inversion, inverting or rotation of the blade selectively in its respective rotary arbor.

4 Claims, 3 Drawing Sheets

DUAL ARBOR SCRAP CHOPPER

BACKGROUND OF THE INVENTION

1. Technical Field

This invention relates to high speed choppers that are used in scrap edge trimming of flat sheet metal or other scrap strip production processes that require effective collection and removal of large quantities of scrap strip material.

2. Description of Prior Art

Prior Art devices of this type have relied on a variety of different configurations all aimed at the same end result of high speed incremental chopping of strip scrap, see for example U.S. Pat. No. 2,125,939, U.S. Pat. No. 3,084,582 and U.S. Pat. No. 3,799,020.

In U.S. Pat. No. 2,125,939, a rotary shear knife is disclosed that uses raked cutting edges on cutting knives positioned on drums so that they register as opposing knives are brought together to shear the material. Each of the knives cutting edges are of an involuted curved configuration so that the cut will be square in relation to the strip being cut.

U.S. Pat. No. 3,084,582 discloses a rotatable shearing blade device for progressive transverse cutting using a pair of blades each mounted on a separate spindle with a gear teeth mechanism inner-connecting them. Each blade is held by bolts and springs for relative adjustment. Each blade has only one cutting edge for engagement against the material to be cut.

In U.S. Pat. No. 3,799,020 a scrap chopper is shown having a fixed station knife and a multiple bladed rotary arbor aligned for cutting registration therewith.

SUMMARY OF THE INVENTION

A dual arbor scrap chopper for use with high speed flat sheet trimming processes that uses multiple edge cutting blades on dual arbors for progressive registration cutting using curved cutting edges configuration for reduced blade wear and decreased noise which is desireable in manufacturing environments.

DESCRIPTION OF THE PREFERRED EMBODIMENT

Figure 1:
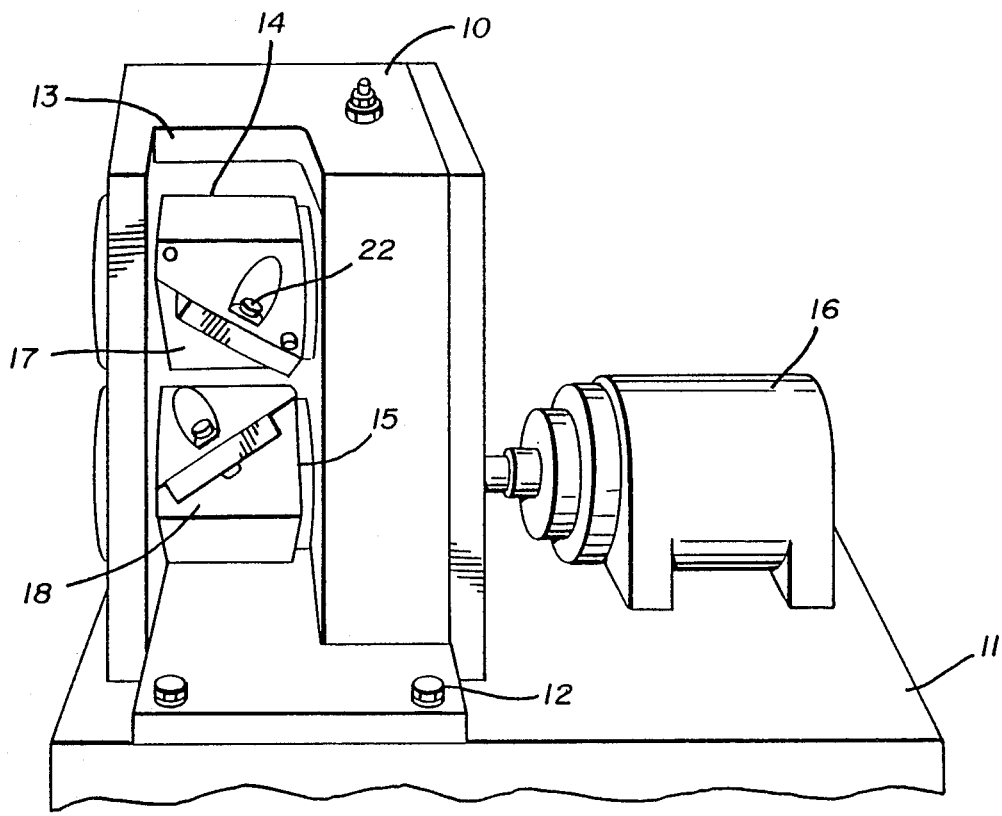
FIG. 1 is a perspective view of the dual arbor scrap chopper with associated drive unit.

A dual arbor scrap chopper can be seen in FIG. 1 of the drawings comprising a mounting enclosure 10 securing to a base 11 by a plurality of fasteners 12. The mounting enclosure 10 has an opening at 13 in which is positioned a pair of rotating arbors 14 and 15 with associated support bearings and inner-connected speed regulator gearing reduction mechanism connected to a motor 16 as will be well understood and known in the art.

Figure 4:
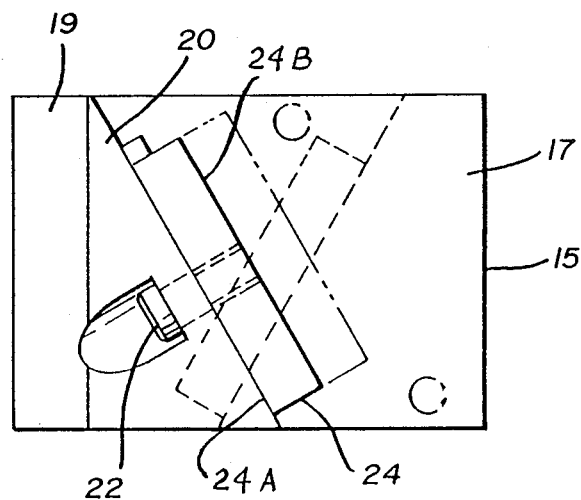
FIG. 4 is a top plan view of relative blade position on the arbor.
Figure 3:
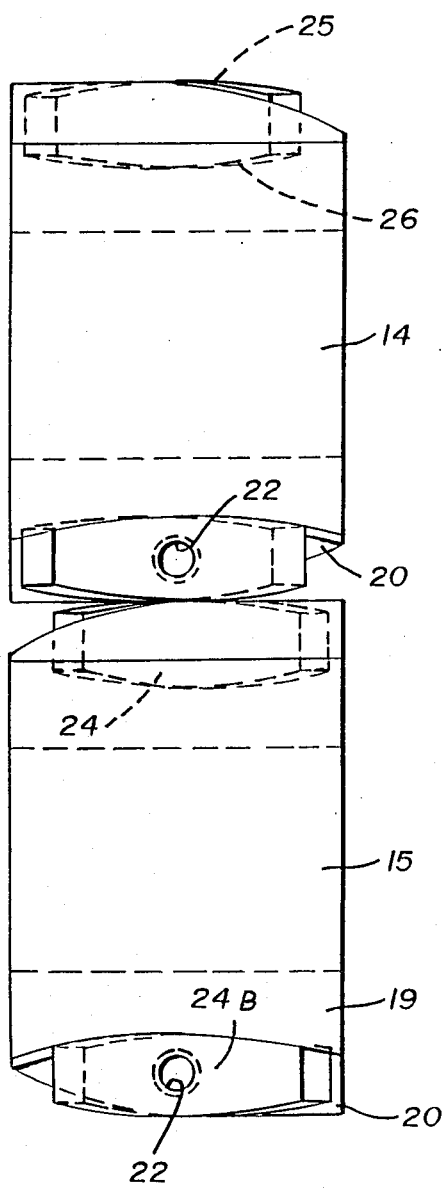
FIG. 3 is an end view on lines 3—3 of FIG. 2.
Figure 2:
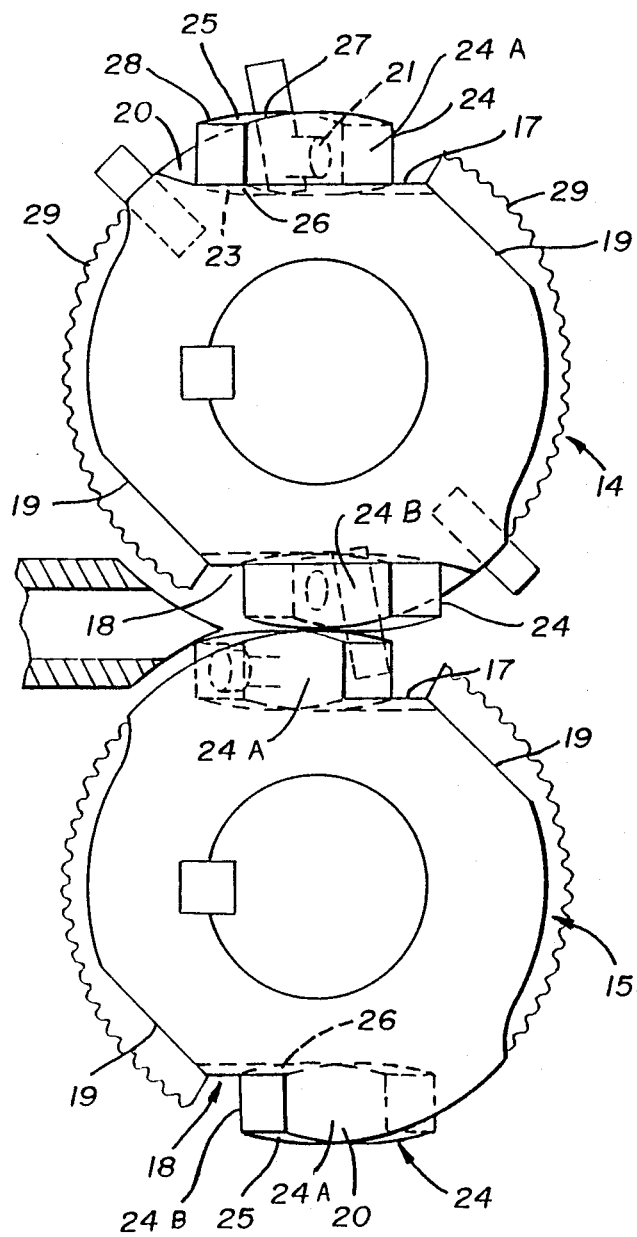
FIG. 2 is a transverse end section of the dual arbor scrap choppered arbors with blade portions and material feeding guide.

Referring now to FIGS. 2, 3 and 4 of the drawings, each of the arbors 14 and 15 has an unique contour outer surface configuration defined by a pair of oppositely disposed angularly aligned transverse recesses 17 and 18. A flattened surface area 19 extends from each transverse recess and provides material clearance as will be explained in greater detail later.

Each of the transverse recesses 17 and 18 extend from the flattened surface area 19 to an angular upstanding edge mount 20 which is apertured at 21 for a blade fastener bolt 22. The surface of the transverse recesses 17 and 18 are concave transversely parallel with the upstanding edge mount 20 defining a blade seat 23. A pair of identical blades 24 are positioned on each drum one in each blade seat 23. Each of the blades 24 is made from a bar blank of a known length, height and thickness having spaced parallel side surfaces 24A, and B, which is then machined to form longitudinally curved transversely flat upper and lower surface 25 and 26 at right angles to said side surfaces 24A and B, each curved surface having two matching oppositely disposed cutting edges 27 and 28. The curved upper and lower surfaces 25 and 26 are defined by true radius not requiring any expensive or difficult compound curved or helical blade formation. The blade seats 23 conform to the blade surfaces 25 and 26 so that the blades 24 when mounted thereon by the blade fastener blot 22 are reversible both front to back and top to bottom giving access to all four cutting edges.

Due to the arbor configuration and blade configuration a unique cutting ability is available upon matched counter rotation of the arbors to bring a pair of oppositely disposed blades and there associated cutting edges into progressive shearing relationship required for cutting strip scrap material at high speed.

To achieve such blade configuration and placement for maximum progressive blade engagement it was necessary to determine the correct blade radius to be formed by use of a true ellipse or the equivalent avoiding a helical blade as here before used. To determine such a radius, it is necessary to view the nature of the cutting required on a cylindrical surface and convert same to a radius that would perform as a helical blade without the time and expense of helical blade manufacture.

Figure 5:
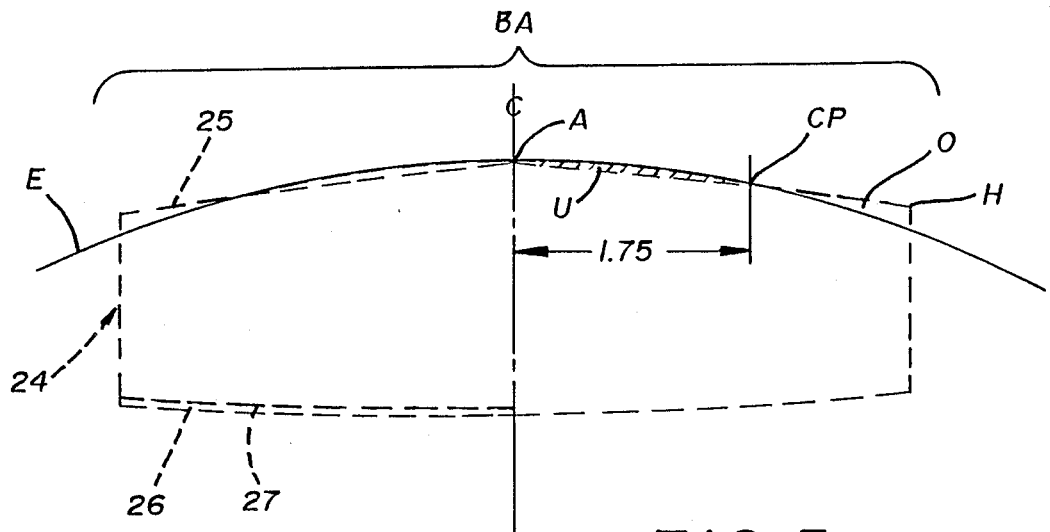
FIG. 5 is graphic illustration of blade curve determination.

Referring now to FIG. 5 of the drawings, a graphic of the comparison between a true elliptical line E and a true radius R on the blade 24 is shown.

Figure 6:
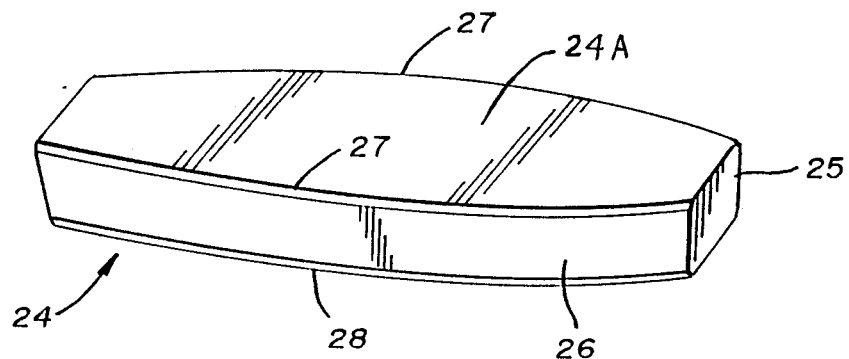
FIG. 6 is a perspective view of a single blade and its associated cutting edges.

A portion of an ellipse is represented on the line E. The representative blade area i.e. the portion of the line E over which ideally the cutting edge of the blade would fall is defined by the letters BA, since in reality only a small portion of the true ellipse can be used in a dual arbor configuration. The relative line position shown in FIGS. 5 and 6 is exaggerated for illustration purposes.

One of the cutting edges 27, 28 on the blade 24 is shown in broken lines superimposed over the elliptical line E. To determine a exceptable simple radius R for the curved surfaces 25 and 26 a crossover point CP is calculated as the distance from the center of the blade where the line E is intersected by the proposed radius of the curved surface of the blade. An example of the same is illustrated in FIG. 5 as having a crossover point of 1.75 inches from center with a calculated radius of 19.8845 having a 0 deviation from the true elliptical line E at A, which is the center of the blade, and at the crossover point of 1.75 inches indicated by CP. The deviation of the selected radius (19.8845) R is under the elliptical line E and is indicated graphically as a shaded area indicated by the letter U. Conversely pass the crossover point CP at 1.75 from the center of the blade the deviation of the selected radius is over or above the elliptical line E as indicated by the letter O. The amount of deviation of the selected radius from the elliptical line E that is acceptable is in direct relation to the thickness of the material to be cut. The greater the material thickness the greater the amount of deviation can be tolerated while the thinner the material must have less deviation.

Referring to FIG. 2 of the drawings a resilient sound pad 29 is shown fastened to the arbors 14 and 15 between their respective angularly upstanding edge mounts 20 to the angularly aligned transverse recesses 17 and 18 forming in opposition a quiet resilient path for the material being cut to follow between the arbors prior to cutting. The resilient sound pad 29 is contoured to compensate for arbor shape variation and is accordingly of varying thickness.

It will thus be seen that a new and novel dual arbor chopper has been illustrated and described and that a method for blade configuration has been illustrated which effectively determines the simple radius on a curved blade which is within the realm of a true three dimensional elliptical surface shear configuration required for increased efficiency and low sound omissions.

Therefore, having thus described my invention, I claim:

1. A dual arbor scrap chopper comprising: a support housing, a pair of oppositely disposed arbors rotatably positioned within said housing, drive means interconnecting and controlling relative rotational speed of said arbors, at least one blade on each arbor, each blade having spaced parallel side surfaces and being secured angularly and transversely of said arbors, said at least one blade on each arbor being oppositely disposed in relation to one another, means for mounting said at least one blade on said arbors in angularly transverse relation said means for mounting including oppositely disposed concave transverse recesses, said means for mounting further including an angularly upstanding edge mount against which said at least one blade is positioned, each of said blades being substantially the same length, height and width, said blades each having outwardly curved transversely flat oppositely disposed upper and lower surfaces at right angles to said side surfaces, cutting edges formed at the intersection of each of said side surfaces and said upper and lower surfaces, the oppositely disposed blades on said arbors being disposed to coact upon matched rotation of said arbors to align their outwardly curved surfaces and associated cutting edges into progressive shearing relationship whereby scrap metal material may be cut at high speeds.

2. A dual arbor scrap chopper of claim 1 wherein said angularly upstanding edge mount is apertured and is disposed in parallel relation to said concave transverse recess, a fastener secured through said apertured angularly upstanding edge mount and to said blade positioned thereagainst.

3. The dual arbor scrap chopper of claim 1 wherein said drive and control means for said arbors comprises a motor, inner-connected speed regulation with gearing reduction and a power source.

4. The dual arbor scrap chopper of claim 2 wherein said arbors have a resilient sound pad secured between said angularly upstanding edge mount and said angularly aligned concave transverse recesses.

* * * * *